United States Patent

Thornton

[11] Patent Number: 6,037,884
[45] Date of Patent: Mar. 14, 2000

[54] TECHNIQUE TO ENCODE MULTIPLE DIGITAL DATA STREAMS IN LIMITED BANDWIDTH FOR TRANSMISSION IN A SINGLE MEDIUM

[75] Inventor: Barry Thornton, Austin, Tex.

[73] Assignee: INT Labs, Inc., Austin, Tex.

[21] Appl. No.: 08/958,184

[22] Filed: Oct. 27, 1997

Related U.S. Application Data

[60] Provisional application No. 60/030,591, Nov. 13, 1996.

[51] Int. Cl.[7] ................................................ H03M 5/08
[52] U.S. Cl. ............................................................ 341/53
[58] Field of Search ................................. 341/53, 54, 52, 341/56, 69; 375/364; 327/227

[56] References Cited

U.S. PATENT DOCUMENTS

| | | |
|---|---|---|
| 4,229,823 | 10/1980 | Thomson et al. ...................... 375/364 |
| 4,605,826 | 8/1986 | Kanemasa . |
| 4,928,289 | 5/1990 | Dingeman . |
| 5,109,391 | 4/1992 | Kurobe . |
| 5,255,287 | 10/1993 | Davies et al. . |

Primary Examiner—Brian Young
Attorney, Agent, or Firm—Haynes and Boone, LLP

[57] ABSTRACT

A technique for encoding multiple digital data streams in a limited bandwidth for transmission in a single medium is described. A pulse tuned to an assigned frequency is generated each time a data stream makes a transition. The polarity of each pulse represents the direction of the corresponding transition. In one aspect, a different length pulse is assigned to each incoming data stream to be encoded such that each incoming data stream will generate pulses of different length, thus occupying a different part of the frequency spectrum. These different pulse lengths create a group of "channels" each representing the activities of a different data stream. in each case, the length of the data pulse is shorter than the length of the fastest individual bit to be processed. The pulses are then summed in an analog summer and transmitted as the new, combined data stream.

28 Claims, 2 Drawing Sheets

TECHNIQUE TO ENCODE MULTIPLE DIGITAL DATA STREAMS IN LIMITED BANDWIDTH FOR TRANSMISSION IN A SINGLE MEDIUM

CROSS-REFERENCE TO RELATED APPLICATION

This application claims the benefit of U.S. Provisional Patent Application Ser. No. 60/030,591, filed on Nov. 13, 1996, and is related to U.S. patent application Ser. No. 08/958,017, filed on Oct. 27, 1997, both of which are hereby incorporated by reference in their entireties.

TECHNICAL FIELD

The invention relates generally to digital data transmission and, more particularly, to a method and system for combining multiple individual asynchronous digital data streams, clocked at one or more data rates, into a serial data stream the bandwidth of which is less than twice the bandwidth of the fastest individual data stream.

BACKGROUND OF THE INVENTION

There are at least two known techniques for achieving the transmission of multiple data streams in a single medium. The first is "time domain multiplexing", or "TDM", in which each of the multiple individual data streams to be combined is sampled and assigned a specific timed space in a new data stream. This new data stream must also include some form of synchronization information that serves to identify the beginning of the data packages. TDM is illustrated in FIG. 1.

Typically, the data sampling rate is eight to ten times that of the highest speed data stream to be sampled to reduce the jitter or time errors incurred during the sampling process. The addition of overhead for the synchronization information runs the bandwidth of the new data stream to a much higher rate than any of the individual data streams.

The second technique is a process in which each individual data stream to be combined is used to modulate an individual carrier. The modulated carriers are then transmitted in a manner similar to that used by individual radio stations in making transmissions. As illustrated in FIG. 2, this technique requires that the total bandwidth be sufficiently wide to accommodate the sum of the carriers and their respective data-bearing sidebands.

It is apparent that the primary disadvantage of both of the techniques described above is the large bandwidth needed to transmit the signals. With the first technique, the bandwidth requirement is due to the data sampling process itself and the overhead required for synchronization in the demultiplexing process. With the second technique, the bandwidth requirement is due to the spectrum spread needed for the individual carriers and their respective sidebands.

Therefore, what is needed is a technique for combining multiple asynchronous data signals in a minimum of bandwidth.

SUMMARY OF THE INVENTION

In a preferred embodiment, the invention comprises a technique for encoding multiple digital data streams in a limited bandwidth for transmission in a single medium. In a preferred embodiment, a pulse tuned to an assigned frequency is generated each time a data stream makes a transition. The polarity of each pulse represents the direction of the corresponding transition, i.e., a positive pulse represents a zero to one transition, or a "rising edge," and a negative pulse represents a one to zero transition, or a "falling edge."

In one aspect of the invention, a different length pulse is assigned to each incoming data stream to be encoded such that each incoming data stream will generate pulses of different length, thus occupying a different part of the frequency spectrum. These different pulse lengths create a group of "channels" each representing the activities of the corresponding data stream. In each case, the length of the data pulse is shorter than the length of the fastest individual bit to be processed. The pulses are then summed in an analog summer and transmitted as the new, combined data stream.

A technical advantage achieved with the invention is that it enables the transmission of digital data as an analog signal, thereby exploiting the bi-polar characteristics of analog signals.

Another technical advantage achieved with the invention is that digital data is reduced to and transmitted as edge transition information only.

Yet another technical advantage achieved with the invention is that the edge transition information is translated into a frequency domain information burst, offering exceptional information packing density in a limited frequency space.

DETAILED DESCRIPTION OF THE PREFERRED EMBODIMENT

Figure 1:
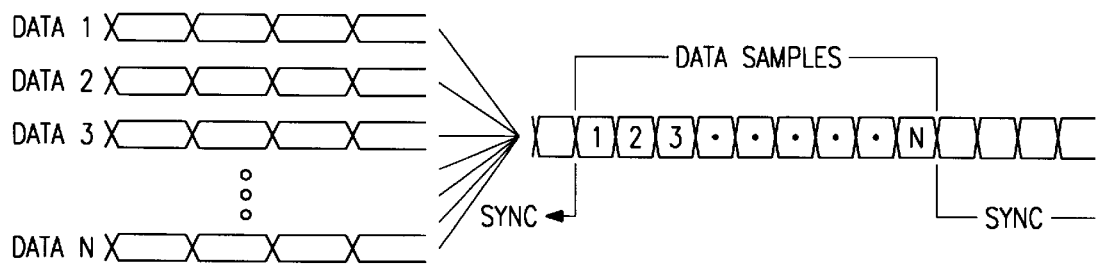
FIGS. 1 and 2 respectively illustrate prior art techniques for transmitting multiple data streams via a single medium.
Figure 2:
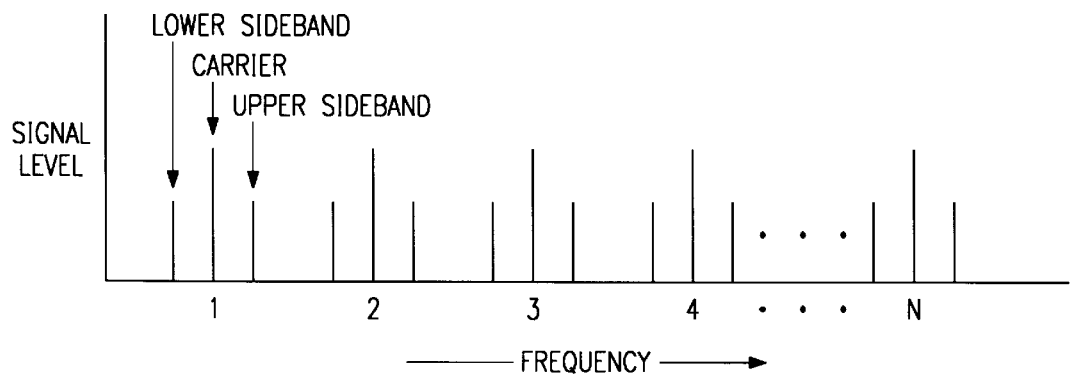

FIGS. 1 and 2 illustrate prior art techniques for achieving the transmission of multiple data streams via a single medium.

Figure 3:
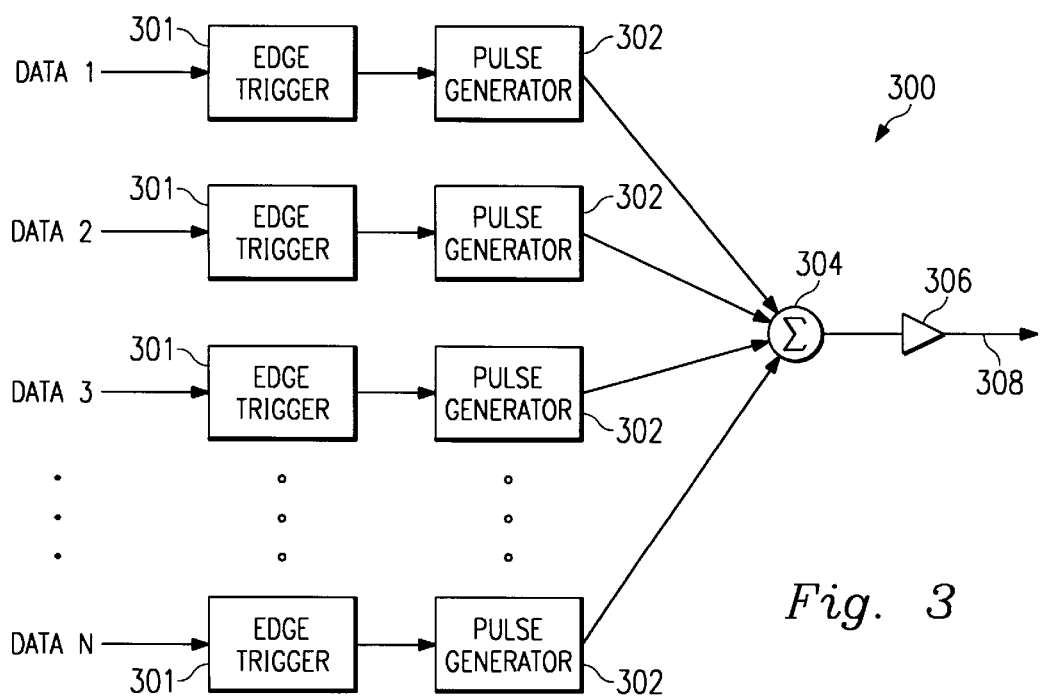
FIG. 3 is a block diagram of a system for implementing the technique of the present invention.

A preferred embodiment of the present invention will now be described with reference to FIGS. 3 and 4. FIG. 3 is a block diagram of an exemplary encoder 300 for implementing the technique of the present invention. In particular, each digital data stream to be encoded is input to a respective one of a plurality of edge trigger circuits 301. Each edge trigger circuit 301 converts the digital data stream input thereto into a series of ticks. In particular, each edge trigger circuit 301 generates a tick each time the data stream transitions from zero to one or one to zero. The polarity of the tick indicates the direction of the transition; that is, a "positive" tick is generated responsive to a transition from zero to one, or a rising edge, and a "negative" tick is generated responsive to a transition from one to zero, or a falling edge.

Figure 4:
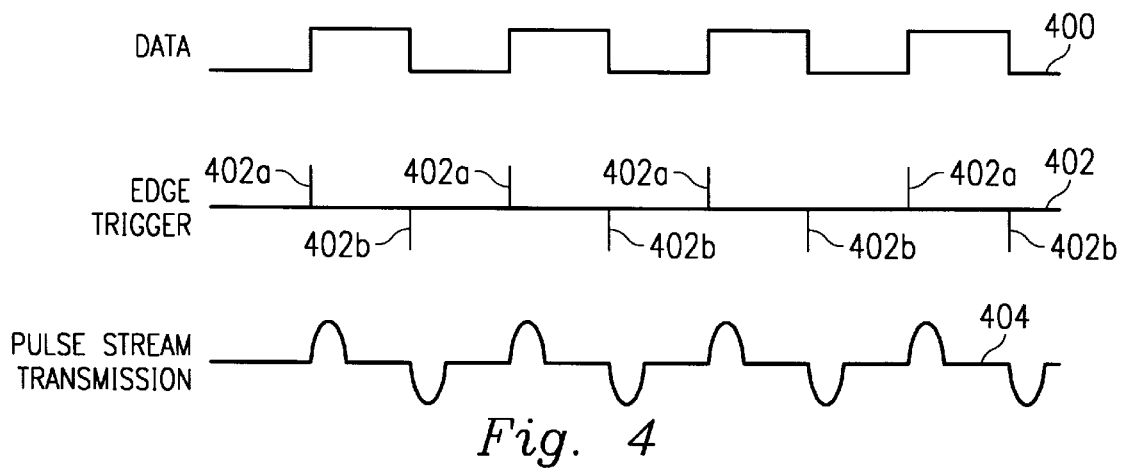
FIG. 4 illustrates a technique embodying features of the present invention for transmitting multiple data streams via a single medium.

This process is further illustrated in FIGS. 4, which shows a digital data stream 400 and the corresponding series of ticks 402 generated by and output from one of the edge trigger circuits 301 to which the data stream 400 is input. As is evident from FIG. 4, positive ticks 402a correspond to zero to one transitions of the data stream 400. Negative ticks 402b correspond to one to zero transitions of the data stream 400.

Referring again to FIG. 3, the series of ticks output from the edge trigger circuits 301 are each input to a respective one of a plurality of pulse generators 302. Each of the pulse generators 302 converts the series of ticks input thereto into a series of half-cycle limited spectral bandwidth pulses of a predetermined length, as will be described. The pulses may be, but are not limited to, sinusoidal or sine-squared pulses. This process is further illustrated in FIG. 4, wherein a series of pulses 404 is generated from the series of ticks 402 by one of the pulse generators 302. It will be noted that each of the pulses are of the same signal polarity of the corresponding tick and hence also correspond to the direction of transition of the data stream 400.

As it will be recognized by those skilled in the art how to implement the edge trigger circuits 301 and pulse generators 302, the details thereof will not be further described herein except as necessary to impart a complete understanding of the invention.

Figure 5:
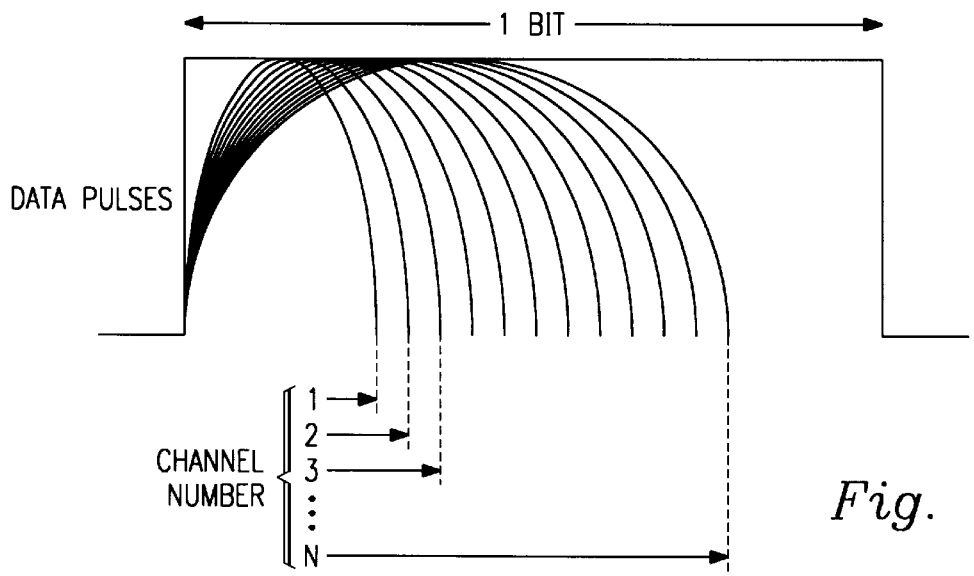
FIG. 5 illustrates the relationship between pulse lengths and transmission channels.
Figure 6:
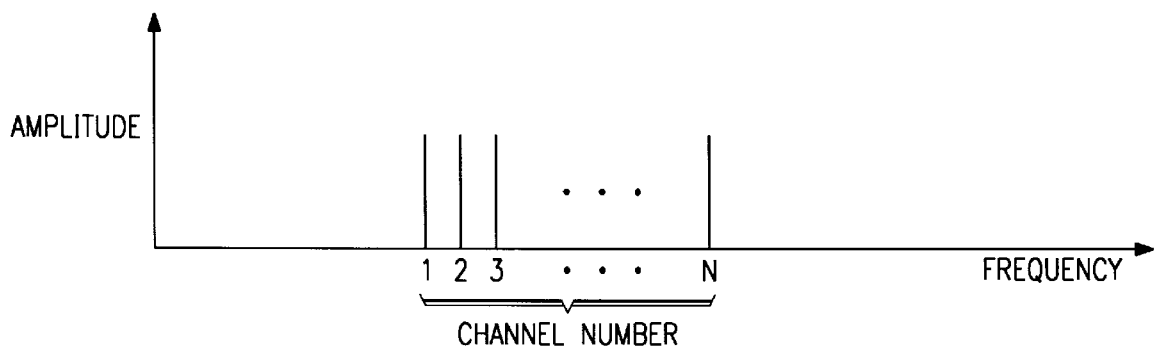
FIG. 6 illustrates the spectral distribution of the transmission channels created using the present invention.

In accordance with a feature of the present invention, each of the pulse generators 302 generate pulses of a different length, and such that the series of pulses output from one of the pulse generators occupies a different part of the frequency spectrum than a series of pulses output from any of the other pulse generators. These different pulse lengths result in the creation of a group of "channels", each representing the activities of a different incoming digital data stream. In each case, the length of the data pulse is shorter than the length of the fastest individual bit to be processed. This concept is illustrated in FIG. 5. In this manner, as illustrated in FIG. 6, each digital data stream input to the encoder 300 to be combined is represented by a different length pulse and thus occupies a different portion of the frequency spectrum.

For example, a first data stream will be assigned to channel 1, which comprises bursts of a first length corresponding to a first frequency, a second data stream will be assigned to channel 2 and represented by bursts of a second length, corresponding to a second frequency, and so on for up to N channels. Again, the only requirement is that the length of the burst be shorter than the fastest individual bit to be processed.

Referring again to FIG. 3, the series of pulses output from the pulse generators 302, such as the series of pulses 404, are summed in an analog summer 304 and then output via a buffer 306 to a transmission medium 308, which may be either a wired or a wireless medium.

Although an illustrative embodiment of the invention has been shown and described, other modifications, changes, and substitutions are intended in the foregoing disclosure. Accordingly, it is appropriate that the appended claims be construed broadly and in a manner consistent with the scope of the invention.

What is claimed is:

1. A method of encoding a digital data stream, the method comprising:
    converting said digital data stream into a series of pulses, wherein each pulse of said series of pulses corresponds to a transition of said digital data stream and a polarity of said pulse indicates a direction of said transition, and wherein each pulse of said series of pulses is of a length corresponding to a predetermined frequency; and
    transmitting said series of pulses via a transmission medium.

2. The method of claim 1 wherein said converting said digital data stream comprises:
    converting said digital data stream into a series of ticks, wherein each tick of said series of ticks corresponds to a transition of said digital data stream and a polarity of said tick indicates a direction of said transition; and
    converting said series of ticks into said series of pulses, wherein each pulse of said series of pulses corresponds to a tick of said series of ticks.

3. The method of claim 1 wherein said digital data stream comprises a plurality of individual bits.

4. The method of claim 3 wherein a length of each of said pulses is shorter than a length of the fastest one of said individual bits.

5. A method of transmitting a plurality of digital data streams via a single transmission medium, the method comprising:
    converting a first one of said digital data streams into a first series of pulses, wherein each pulse of said first series of pulses corresponds to a transition of said first digital data stream and a polarity of said pulse indicates a direction of said transition, and wherein each pulse of said first series of pulses is of a first length corresponding to a first frequency;
    converting a second one of said digital data streams into a second series of pulses, wherein each pulse of said second series of pulses corresponds to a transition of said second digital data stream and a polarity of said pulse indicates a direction of said transition, and wherein each pulse of said second series of pulses is of a second length corresponding to a second frequency;
    summing said first and second series of pulses using an analog summer; and
    transmitting said summed first and second series of pulses via said single transmission medium.

6. The method of claim 5 further comprising:
    for N=3 to n, converting an Nth one of said digital data streams into an Nth series of pulses, wherein each pulse of said Nth series of pulses corresponds to a transition of said Nth digital data stream and a polarity of said pulse indicates a direction of said transition, and wherein each pulse of said Nth series of pulses is of an Nth length corresponding to an Nth frequency;
    summing all of said series of pulses using said analog summer; and
    transmitting said summed series of pulses via said transmission medium.

7. The method of claim 5 wherein said converting said first one of said digital data streams comprises:
    converting said first digital data stream into a first series of ticks, wherein each tick of said first series of ticks corresponds to a transition of said first digital data stream and a polarity of said tick indicates a direction of said transition; and
    converting said first series of ticks into said first series of pulses, wherein each pulse of said first series of pulses corresponds to a tick of said first series of ticks.

8. The method of claim 5 wherein said converting said second one of said digital data streams comprises:
    converting said second digital data streams into a second series of ticks, wherein each tick of said second series of ticks corresponds to a transition of said second digital data stream and a polarity of said tick indicates a direction of said transition; and
    converting said second series of ticks into said second series of pulses, wherein each pulse of said second series of pulses corresponds to a tick of said second series of ticks.

9. The method of claim 5 wherein each of said plurality of digital data streams comprises a plurality of individual bits.

10. The method of claim 9 wherein a length of each of said pulses is shorter than a length of the fastest one of said individual bits.

11. A method of transmitting a plurality of digital data streams via a single transmission medium, the method comprising:

for N=1 to n, converting an Nth one of said digital data streams into an Nth series of pulses, wherein each pulse of said Nth series of pulses corresponds to a transition of said Nth digital data stream and a polarity of said pulse indicates a direction of said transition, and wherein each pulse of said Nth series of pulses is of an Nth length corresponding to an Nth frequency;

analog summing all of said series of pulses; and transmitting said summed series of pulses via said single transmission medium.

12. The method of claim 11 wherein said converting said Nth one of said digital data streams comprises:

converting said Nth digital data stream into an Nth series of ticks, wherein each tick of said Nth series of ticks corresponds to a transition of said Nth digital data stream and a polarity of said tick indicates a direction of said transition.

13. The method of claim 11 wherein each of said plurality of digital data streams comprises a plurality of individual bits.

14. The method of claim 13 wherein a length of each of said pulses is shorter than a length of the fastest one of said individual bits.

15. Apparatus for transmitting a plurality of digital data streams via a single transmission medium, the apparatus comprising:

means for converting a first one of said digital data streams into a first series of pulses, wherein each pulse of said first series of pulses corresponds to a transition of said first digital data stream and a polarity of said pulse indicates a direction of said transition, and wherein each pulse of said first series of pulses is of a first length corresponding to a first frequency;

means for converting a second one of said digital data streams into a second series of pulses, wherein each pulse of said second series of pulses corresponds to a transition of said second digital data stream and a polarity of said pulse indicates a direction of said transition, and wherein each pulse of said second series of pulses is of a second length corresponding to a second frequency;

means for summing said first and second series of pulses; and means for transmitting said summed first and second series of pulses via said transmission medium.

16. The apparatus of claim 15 further comprising:

means for converting a third one of said digital data streams into an third series of pulses, wherein each pulse of said third series of pulses corresponds to a transition of said third digital data stream and a polarity of said pulse indicates a direction of said transition, and wherein each pulse of said third series of pulses is of an third length corresponding to an third frequency;

summing said first, second, and third series of pulses using said analog summer; and transmitting said summed series of pulses via said transmission medium.

17. The apparatus of claim 15 wherein said means for converting said first one of said digital data streams comprises:

means for converting said first digital data streams into a first series of ticks, wherein each tick of said first series of ticks corresponds to a transition of said digital data stream and a polarity of said tick indicates a direction of said transition; and means for converting said first series of ticks into said first series of pulses, wherein each pulse of said first series of pulses corresponds to a tick of said first series of ticks.

18. The apparatus of claim 15 wherein said means for converting said second one of said digital data streams comprises:

means for converting said second digital data streams into a second series of ticks, wherein each tick of said second series of ticks corresponds to a transition of said digital data stream and a polarity of said tick indicates a direction of said transition; and means for converting said second series of ticks into said second series of pulses, wherein each pulse of said second series of pulses corresponds to a tick of said second series of ticks.

19. The apparatus of claim 15 wherein each of said plurality of digital data streams comprises a plurality of individual bits.

20. The apparatus of claim 19 wherein a length of each of said pulses is shorter than a length of the fastest one of said individual bits.

21. The apparatus of claim 15 wherein each of said means for converting comprise an edge trigger and pulse generator.

22. The apparatus of claim 15 wherein said means for summing comprises an analog summing circuit.

23. The apparatus of claim 18 wherein said means for converting said first digital data streams into a first series of ticks comprises an edge trigger and wherein said means for converting said first series of ticks into said first series of pulses comprises a pulse generator.

24. The method of claim 1 wherein said series of pulses has a constant frequency.

25. A method of encoding a digital data stream in preparation for combining the digital data stream with at least one other digital data stream, comprising the steps of:

converting said digital data stream into a series of pulses, wherein each pulse of said series of pulses corresponds to a transition of said digital data stream and a polarity of said pulse indicates a direction of said transition, and wherein each pulse of said series of pulses is of a length corresponding to a predetermined frequency, and wherein said length of said series of pulses converted from said digital data stream differs from a length of each one of said at least one other series of pulses converted from a corresponding one of said at least one other digital data stream;

transmitting said series of pulses via a transmission medium.

26. The method of claim 25 wherein said converting said digital data stream comprises:

converting said digital data stream into a series of ticks, wherein each tick of said series of ticks corresponds to a transition of said digital data stream and a polarity of said tick indicates a direction of said transition; and converting said series of ticks into said series of pulses, wherein each pulse of said series of pulses corresponds to a tick of said series of ticks.

27. The method of claim 25 wherein said digital data stream comprises a plurality of individual bits.

28. The method of claim 27 wherein a length of each of said pulses is shorter than a length of the fastest one of said individual bits.

* * * * *